(12) United States Patent
Sristi et al.

(10) Patent No.: US 12,135,694 B2
(45) Date of Patent: Nov. 5, 2024

(54) CONTENT REPLICATION BETWEEN TENANTS

(71) Applicant: SAP SE, Walldorf (DE)

(72) Inventors: Suneel Sristi, Bangalore (IN); Sahana Durgam Udaya, Bangalore (IN); Abhishek Nagendra, Bangalore (IN)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 18/056,671

(22) Filed: Nov. 17, 2022

(65) Prior Publication Data
US 2024/0168926 A1 May 23, 2024

(51) Int. Cl.
*G06F 16/178* (2019.01)
*G06F 16/176* (2019.01)

(52) U.S. Cl.
CPC .......... *G06F 16/178* (2019.01); *G06F 16/176* (2019.01)

(58) Field of Classification Search
CPC .............................. G06F 16/178; G06F 16/176
USPC ........................................................ 707/634
See application file for complete search history.

(56) References Cited

U.S. PATENT DOCUMENTS

| | | | |
|---|---|---|---|
| 8,577,835 B2 | 11/2013 | Doshi et al. | |
| 9,971,529 B1 * | 5/2018 | LeCrone | G06F 3/067 |
| 10,157,196 B2 | 12/2018 | Baker et al. | |
| 10,768,920 B2 | 9/2020 | Fontoura et al. | |
| 11,366,842 B1 * | 6/2022 | Swaminathan | G06F 17/18 |
| 2011/0302133 A1 | 12/2011 | Kuruganti et al. | |
| 2012/0254111 A1 * | 10/2012 | Carmichael | G06F 16/134 707/610 |
| 2016/0196324 A1 | 7/2016 | Haviv et al. | |
| 2019/0129986 A1 | 5/2019 | Birn et al. | |
| 2021/0099380 A1 * | 4/2021 | Suryanarayana | H04L 41/0806 |
| 2021/0258267 A1 * | 8/2021 | Vishwakarma | H04L 47/225 |
| 2021/0320968 A1 * | 10/2021 | Chu | G06F 21/6272 |
| 2022/0012134 A1 * | 1/2022 | Chatterjee | G06F 11/1469 |
| 2022/0121629 A1 | 4/2022 | Nair et al. | |
| 2022/0201073 A1 * | 6/2022 | Mallikarjuna Durga Lokanath | G06F 9/45558 |
| 2022/0263897 A1 * | 8/2022 | Karr | G06F 11/1448 |

OTHER PUBLICATIONS

European Patent Office, Extended European Search Report, issued in EU Application No. 23189349.6-1203, dated Jan. 5, 2024, 10 pgs.

* cited by examiner

*Primary Examiner* — Hosain T Alam
*Assistant Examiner* — Nicholas E Allen
(74) *Attorney, Agent, or Firm* — Fountainhead Law Group, PC

(57) ABSTRACT

Content replication between tenants is provided using a user interface to an application of an enterprise tenant. The user interface includes a list of files shared by an embedded tenant. A user can select one or more selected files from the list of files. This initiates a replicate content job based on the one or more selected files. The replicate content job includes pulling each of the one or more selected files from the embedded tenant to the enterprise tenant and storing the file in the enterprise tenant database.

20 Claims, 9 Drawing Sheets

CONTENT REPLICATION BETWEEN TENANTS

BACKGROUND

The present disclosure pertains to databases and in particular to replication of database objects for between tenants.

Cloud platforms may provide cloud application. For example, an analytics application can include tools that analyze data and provide insights on that data to use for planning and decision making. Analytics content including data models, visualizations of data, dashboards, etc. play a central role in enabling users to discover such insights. Hence, sharing of such analytics content across users may be advantageous. Some cloud platforms provide a persistence layer to store and manage packages of analytics content to enable sharing. The persistence layer refers to a file based storage that may be used to store contents of a package in the form of a file. However, cloud storage space may be limited (e.g., per tenant or per user), thereby limiting the ability of the analytic content packages to be shared.

Another difficulty is that some applications may be embedded into other applications, which provide different functionality. There is a need for improved techniques for sharing content between tenants.

The present disclosure addresses these issue and others, as further described below.

DETAILED DESCRIPTION

Figure 1:
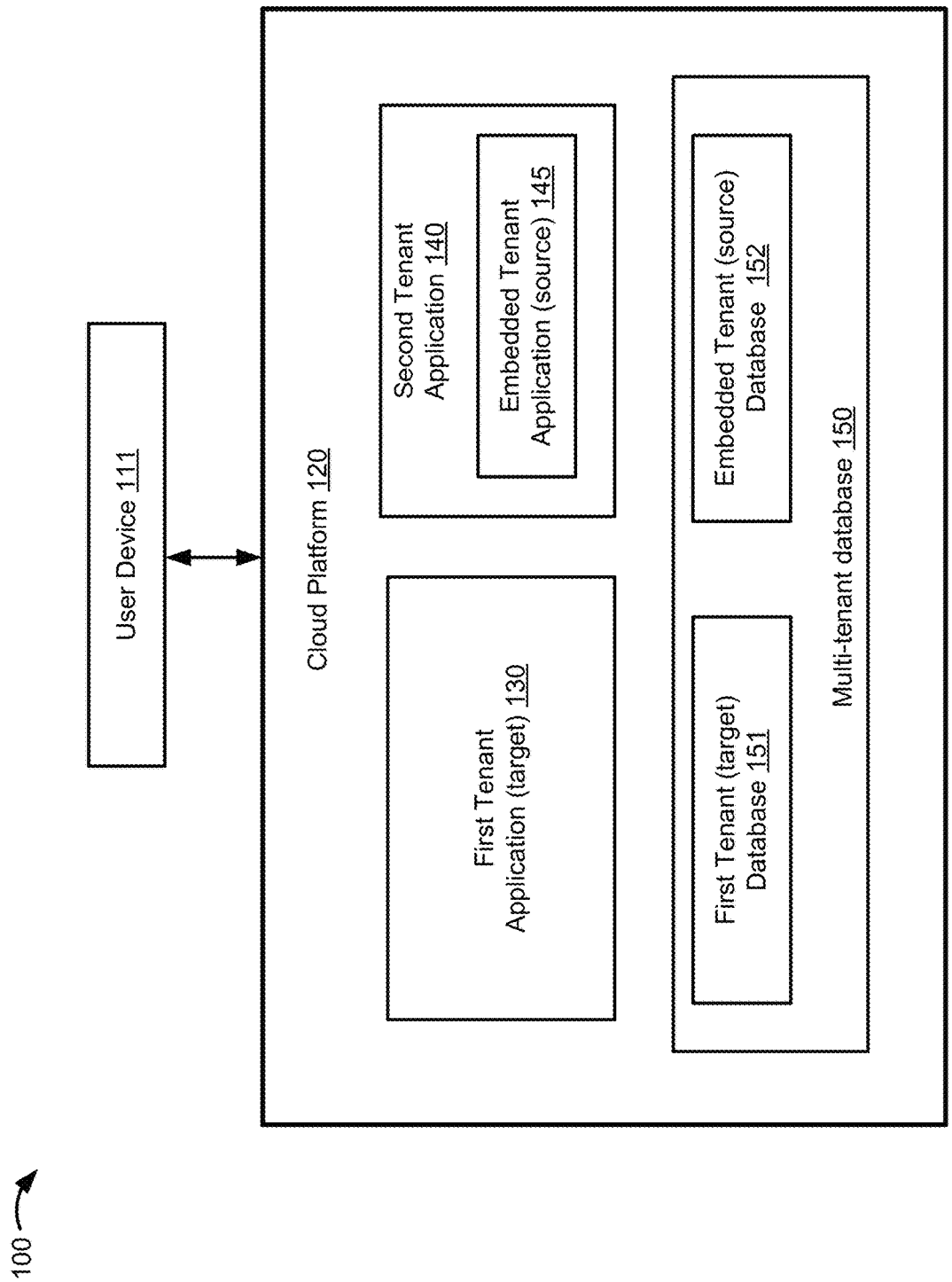
FIG. 1 shows a diagram of a cloud platform providing replication of content between tenants, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, cloud platforms may provide cloud application. For example, an analytics application can include tools that analyze data and provide insights on that data to use for planning and decision making. Analytics applications may enable users to create analytics content in the form of visualization dashboards (referred to as "stories"), data models, dimensions, connections, value-driver trees, etc. Users may wish to share such content with other users, even across tenants. Analytics content including data models, visualizations of data, dashboards, etc. play a central role in enabling users to discover such insights. Hence, sharing of such analytics content across users of other tenants may be advantageous. Some cloud platforms provide a persistence layer to store and manage packages of analytics content to enable sharing. The persistence layer refers to a file based storage that may be used to store contents of a package in the form of a file. However, cloud storage space may be limited (e.g., per tenant), thereby limiting the ability of the analytic content packages to be shared.

Besides the limitation on cloud storage in a persistence layer, another difficulty is that some applications may be embedded into other applications, which provide different functionality.

In some situations there are further challenges in transporting content. For instance, an organization may operate both an Enterprise Application and line-of-business (LoB) tenant (also referred to as an "LoB application"). In such cases transporting content created in the LoB tenant to the Enterprise tenant may not be possible if a sharing mechanism is not available in the LoB tenant. In such cases a user may need to manually create all the content in Enterprise tenant that is present in the LoB tenant.

There is a need for improved techniques for sharing content between tenants.

The present disclosure provides transportation of content from one database tenant to another database tenant via replication of the content. For example, a user may transport content from a second tenant using an embedded version of an analytics application to a first tenant. The content may not be associated after the replication operation has completed however the replication can be triggered to obtain updates.

In a multi-tenant cloud computing platform, "tenants" refer to different entities having separate (isolated) data on the same platform (e.g., separate tenant databases on the same database system).

An overview of content replication between database tenants is now provided.

A user can trigger replication of content from a source tenant to a destination tenant by performing the following steps. First, in the destination tenant, the user may access a content replication user interface and enter a URL or the source tenant. The user may also select a particular application from a list of applications. The user interface may be provided by a cloud application and be accessible using a web browser. This user interface may be referred to as a "parent window."

After inputting the URL, the user may be presented with a second user interface for authenticating with the source tenant. This user interface may be referred to as a "child window." With this user interface the user may authenticate with or login to the source tenant. Once authenticated, the user may select files to import from a list of files. The list may include a name and a description of the files. The user may make selections using check boxes. After the files are selected, the user may review and confirm their selection. This initiates the replication of content in the background, importing the selected files from the source tenant to the destination tenant.

A content replication job request may be sent to a backend service. The request may contain the user selected objects along with the source tenant details from where the content must be replicated. For example, the request may include the source tenant URL and an identifier and/or name of each selected object.

After the objects have been replicated from the source tenant to the destination tenant, users of the destination tenant may be able to perform the same or similar operations on the replicated content that could be performed by users of the source tenant. For example, if an analytical report is replicated, a user may share, edit, delete, or update the report.

Using content replication between tenants, the objects (e.g., stories) are replicated from the source tenant database to the destination tenant database using an intermediary file-based persistence layer storage.

Before providing further details and an example of techniques for content replication between tenants, a description of embedded applications and package-based and persistence layer-based techniques are described for contrast.

In package-based sharing, a source tenant may create a package of objects. The package may include one or more data objects from a source tenant database. The package may be shared to a destination tenant by providing a Uniform Resource Locator (URL). The URL may be used by a user of the destination tenant to import the package from the source tenant.

Certain enterprise cloud applications may provide sharing of packages of objects using a URL as described above. However, some other applications may use an embedded version of the cloud application which does not provide this package-based sharing functionality. For instance, an application for a particular line-of-business may include an embedded analytics application that does not include a user interface providing package-based sharing.

Besides the lack of functionality for certain embedded applications, package-based sharing may require use of a separate persistence layer, such as a cloud-based file storage. That is, the persistence layer storage is separate from the tenant database storage. In persistence layer-based package sharing, a cloud platform may allocate a certain amount of storage space to different tenants. For example, the storage in the persistence layer may be used to share analytics content of an analytics application across tenants. In, a user may create packages (e.g., sets) of analytics content to be stored in the persistence layer. A package may include details of each object (e.g., data object of analytics content) present in the package as well as dependency information between those objects. The package may also include package metadata or an overview that summaries the content details. For example, package metadata may include version information and a list of object information for each object including an object type, an object name, an object identifier, and an ancestor path.

Users may view a listing of available content packages, select packages, and import them for their analytics workflow. This may include public packages of analytics content (e.g., templates or demonstration content) or private content (e.g., packages privately shared by the creator).

In persistence layer-based sharing, a user may create a package and export (e.g., share) it to the persistence layer, and then other users may import the package from the persistence layer. To create and export a package a user may select an option in the cloud analytics application to create a new package or export a package. Then the user may select objects (e.g., a database artifact such as a dashboard/story artifact, data model, dimension, roles, folder, etc.). The user may provide information such as package name, description, details. The user may optionally share with destinations, selects industry, etc. The user may also review package summary prior. Then the user may initiate export of the package to create a new package in the persistence layer of the cloud storage system.

An example process for exporting a package to a persistence layer is described. The user may access the cloud platform using a web browser and initiate export of the package, for example. The browser may send package details to a content manager service, which may perform authorization checks. The content manager service may then get the selected object metadata and object content from a service of the database where it is stored. The database service may return the object details to the content manager service, which may save the package metadata to a content manager database server, which may provide a response back to the content manager service. The content manager service may then save package metadata and package content to a persistency layer of the cloud platform (e.g., of the content manager database server). The persistence layer may send the content manager service an indication that the package was created and the content manager service may send the browser an indication that the package was created. By this information flow the user has exported a package of analytics content to the persistence layer such that it may be shared with other users.

In persistence layer-based sharing, a user may import a public package or a private package shared with them. To do this, the user may initiate the import workflow, select a package to be imported, optionally review a package summary, optionally update import preferences and object location as needed, and initiate the import of the package. For example, the user may initiate import of a package using a web browser accessing the cloud platform. The browser may send package details to the content manager service, which may perform authorization checks. The content manager service may get package metadata from the content manager database service, which provides it in a response. The content manager service may then get package content from the persistence layer, which provides it in a response. The content manager service may then send a request to the database service (e.g., the database service for the cloud application for this user, similar to the database service for the other user that created the package) to create an object using information from the package. The database service may create the object using the information from the package and send a response to the content manager service. The content manager service may then notify the browser that the package has been imported. Thus, a package created by one user may be imported and stored by another user, potentially across tenants.

However, as discussed above, using a persistence layer has some drawbacks. For example, there may be space limitations (e.g., each tenant may be limited to 300 MB, 500 MB, 1 TB, etc. of cloud storage space). Additional storage resources may potentially be available however storage resources are not infinite nor without cost. Accordingly, one of the drawbacks of sharing content to a persistence layer on a cloud platform includes users having to manage packages by deleting unwanted packages. Another drawback is that users need to determine which packages are unwanted using sort by date but without other smarter ways of determining unwanted packages. Another drawback is that the same object may be duplicated across packages, consuming cloud space and it is not possible to determine which all packages contain same objects.

Another drawback of package-based sharing is that it may be difficult to update packages. In package-based sharing, creation and export are two steps of the process and importing is a third step. If an object is updated, the user might re-export each package that includes that object that this update can then be re-imported by the other user.

Content Replication Between Database Tenants

The present disclosure provides techniques for content replication between tenants, introduced above.

FIG. 1 shows a diagram 100 of a cloud platform 120 providing content replication between tenants, according to an embodiment. The cloud platform 120 provides a first tenant application (target) 130 and a second tenant application 140. The first tenant application 130 and the second tenant application 140 may be cloud applications. In some embodiments the first tenant application 130 may be an enterprise analytics application. In some embodiments the second tenant application 140 may be a line-of-business (LOB) application.

The second tenant application 140 includes an embedded tenant application (source) 145. The embedded tenant application may be an embedded analytics application that is embedded within the second tenant application 140.

The cloud platform 120 includes a multi-tenant database 150 including a first tenant database 151 for the first tenant application 130. The multi-tenant database 150 also includes an embedded tenant (source) database 152 for the embedded tenant application 145. The multi-tenant database 150 may also include a tenant database (not shown) for the second tenant application 140. The term "multi-tenant" refers to a software architecture in which physical resources (e.g., computer machines, processing units, memory, etc.) are shared among a plurality of "tenants," which refers to different groups of users having different access to data and information (e.g., users within a tenant access their own application and data and may not access an application or data of another tenant).

A user device 111 may access the cloud platform 120. For example, the user device 111 may access the first tenant application 130 via a web browser.

A user of the user device 111 can access the first tenant application 130 and trigger replication of content from the embedded tenant database 152 to the first tenant database 151. First, in the first tenant application 130, the user may access a content replication user interface and enter a URL of the second tenant application 140. The user may also select a particular application from a list of applications. The user interface provided by the first tenant application 130 for inputting the URL may be referred to as a "parent window."

After inputting the URL, the user may be presented with a second user interface for authenticating with the second tenant application 140. This user interface may be referred to as a "child window." With this user interface the user may authenticate with or login to the second tenant application 140. Once authenticated, the user may select files to import from a list of files. The list may include a name and a description of the files. The second tenant application 140 may obtain the list of objects from the embedded tenant application 145. The objects may be stored in the embedded tenant database 152.

Figure 8:
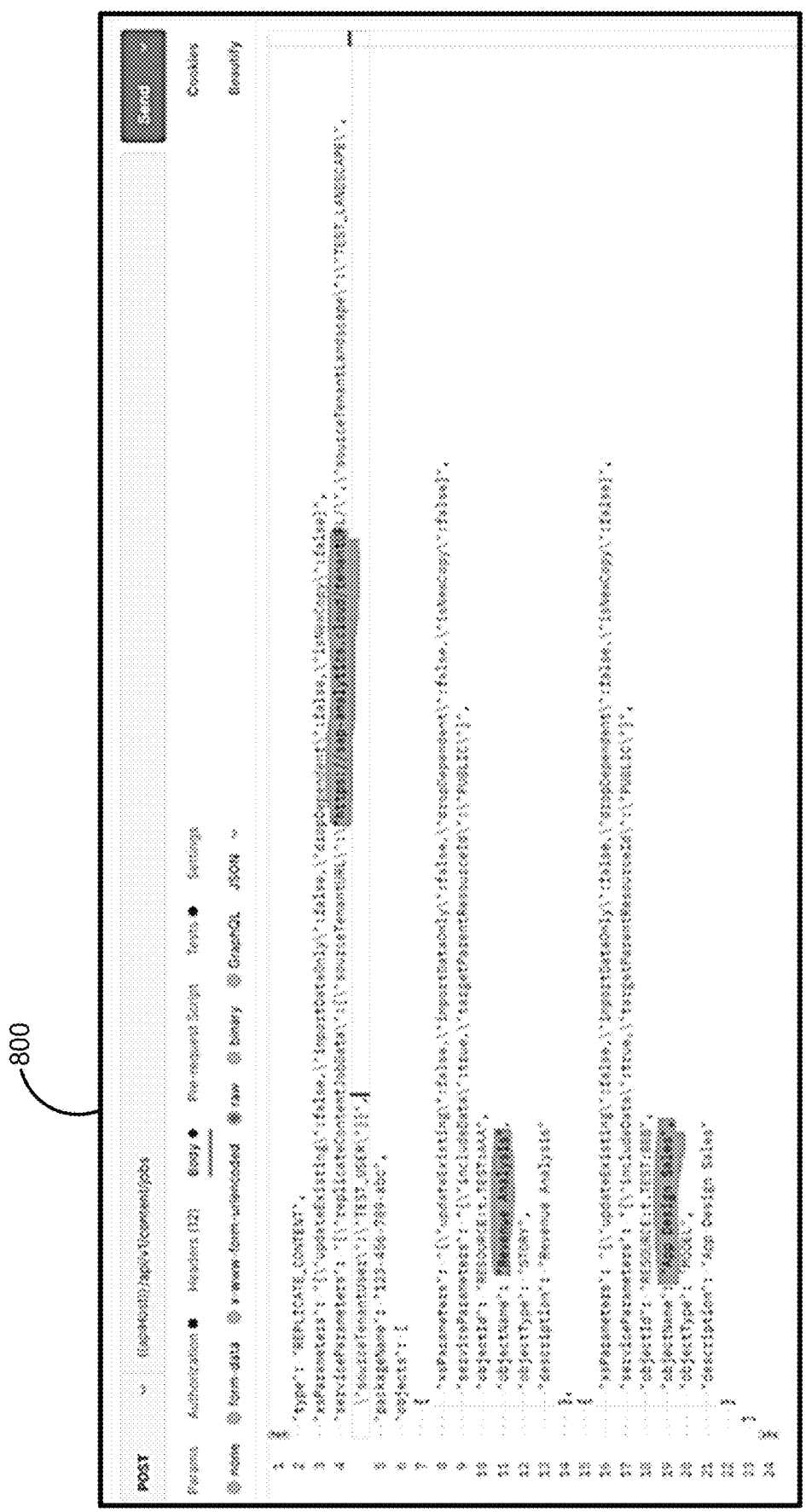
FIG. 8 shows an example of a replicate content job request, according to an embodiment.

The user may make selections of objects to be replicated from the embedded tenant database 152 to the first tenant database 151. After the files are selected, the user may review and confirm their selection. This initiates the replication of content in the background, importing the selected files from the source tenant to the destination tenant. A content replication job request may be sent to a backend service, for example. An example of a content replication job request is shown in FIG. 8 and is described below.

Using techniques for content replication between tenants, explained in further detail below, the objects (e.g., stories) are replicated from the embedded tenant database 152 to the first tenant database 151 using an intermediary file-based persistence layer storage.

In one example of content replication, the user may log-in to an enterprise tenant ("parent window") and clicks on "Import from LoB tenant" option. In the parent window, the user may enter a LoB URL. Since the workflow is triggered from the enterprise application, it relies on the LoB tenant to provide its respective embedded tenant URL. Each LoB tenant may expose a REST API for retrieving embedded SAC tenant URL. The enterprise application may leverage this REST API to get embedded tenant URL. Then it opens a child window with embedded tenant URL (prompts for login—if required).

In child window, the user can log-in to the embedded tenant using LoB credentials. The child window may lists objects for replication and enable to user to select the objects. Then the child window communicates the user selected objects to parent window. This communication may be done via Javascript postMessage.

Then the user may review and confirm the user selection. Post confirmation, triggers replicate content job in enterprise content management service (CMS). The enterprise CMS performs pre-requisite job parameters validations. If all validation passes, then a replicate content job is created. The replicate content job state is set to PENDING.

Then a job is picked for execution. Then the replicate content job state is set to EXECUTING. This triggers an export package (temporary) on embedded CMS: share the package with target tenant. Then import above package in enterprise CMS. After importing the package, clean-up temporary folders and delete above package. As such, the job is completed. Then the replicate content job state is set to either DONE or FAILED depending on whether the import was successful.

A more detailed explanation of this example is provided below with respect to FIG. 3.

Figure 2:
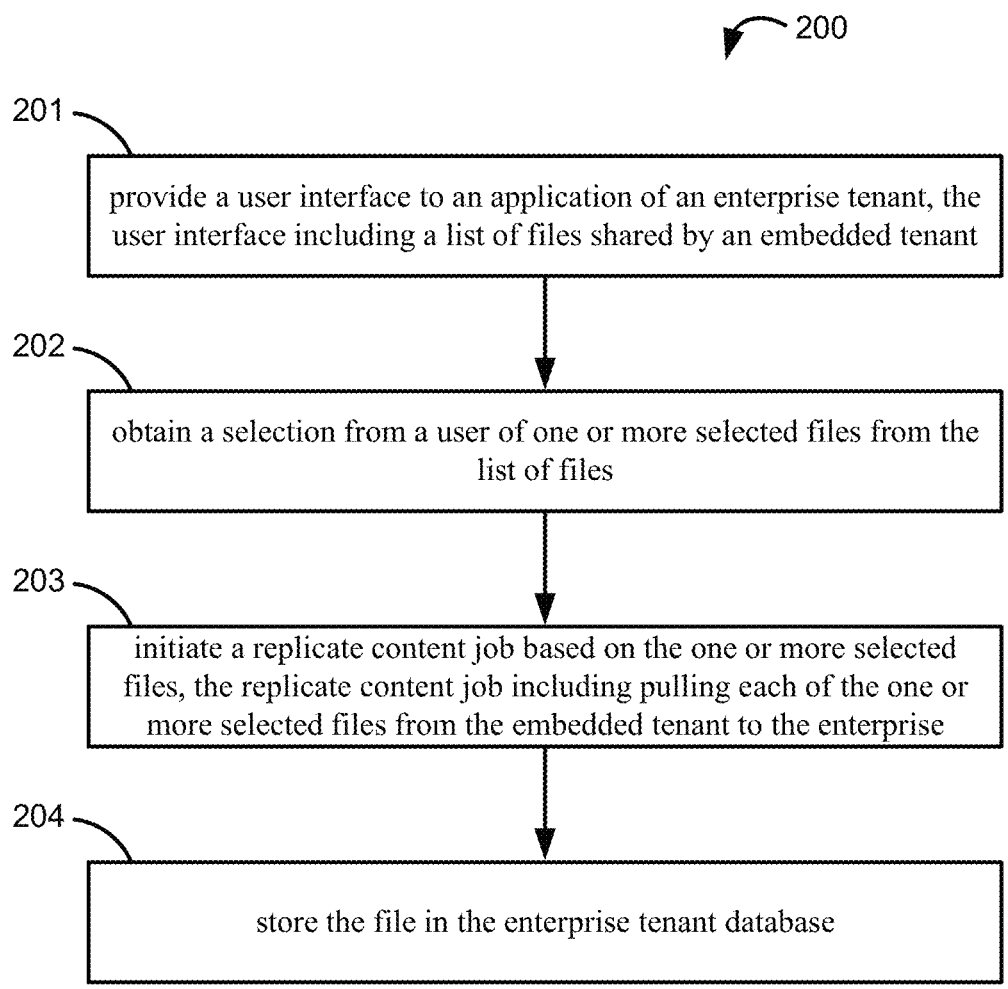
FIG. 2 shows a diagram of a method for replicating content between tenants, according to an embodiment.

FIG. 2 shows a diagram 200 of a method for content replication, according to an embodiment. The method may be performed by a cloud platform such as the one described above with respect to FIG. 1. The method may be performed by executing computer program code comprising instructions. The computer program code may be stored on a non-transitory computer readable medium.

At 201, the method may provide a user interface to an application of an enterprise tenant, the user interface including a list of files shared by an embedded tenant. The list of files may be obtained using a URL input by the user as discussed above.

At 202, the method may obtain a selection from a user of one or more selected files from the list of files. The files selected may be pulled from an embedded tenant as described herein. As used herein, "pull" refers to a transfer that is initiated by the receiver.

At 203, the method may initiate a replicate content job based on the one or more selected files, the replicate content job including pulling each of the one or more selected files from the embedded tenant to the enterprise. The replicate content job is described in further detail below with respect to FIG. 3.

At 204, the method may store the file in the enterprise tenant database. Thus, the content may be replicated from the embedded tenant to the enterprise tenant.

Example of Content Replication Between Database Tenants

The following is an example implementation of content replication between database tenants.

Figure 3:
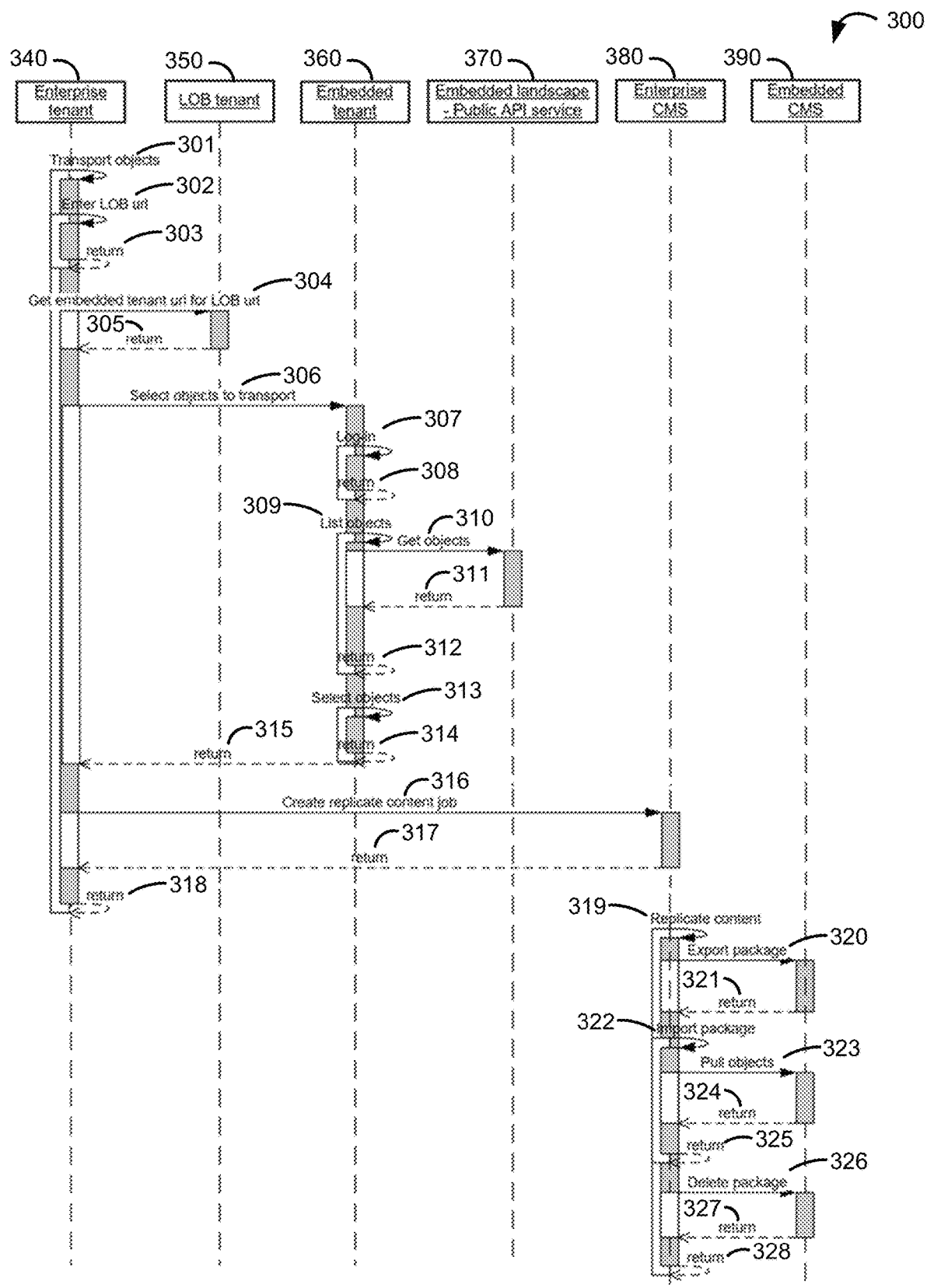
FIG. 3 shows a diagram of content replication between an enterprise tenant of an enterprise application and a long-of-business (LOB) tenant of a LOB application, according to an embodiment.

FIG. 3 shows a diagram 300 of content replication between an enterprise tenant 340 of an enterprise application and a line-of-business (LOB) tenant 350 of a LOB application, according to an embodiment. The LOB tenant 350 includes an embedded tenant 360 of an embedded application, which provides an embedded landscape public API service 370. The enterprise application includes an enterprise content management service (CMS) 380. The embedded application provides an embedded content management service (CMS) 390.

At 301, the enterprise tenant 340 initiates a "transport objects" user interface or function for transporting objects via content replication. For example, a user may select a menu within the enterprise application to initiate transportation of objects.

At 302, a user of the enterprise tenant 340 enters a LOB URL. That is, the URL used to access files provided by the LOB tenant 350. The URL may be input via a "parent window" as described above.

At 303, the enterprise tenant 340 executes a return. For instance, the user may confirm the LOB URL that they input to access that URL.

At 304, the enterprise tenant 340 sends a request to the LOB tenant 350 to get an embedded tenant URL for the LOB URL.

At 305, the LOB tenant 350 returns the embedded tenant URL.

At 306, the enterprise tenant 340 may send a request, using the embedded tenant URL, to the embedded tenant 360 to select objects to transport.

At 307, the embedded tenant 360 provides a user interface for logging in to the embedded tenant 360. This user interface may be a "child window" as described above. The user of the enterprise tenant 340 may input authentication information such as a login and/or a password into the user interface of the embedded tenant 360 to obtain access.

At 308, the embedded tenant 360 receives and verifies the authentication information and returns an indication of whether the authentication was successful.

At 309, if the authentication was successful, the embedded tenant 360 provides a list of objects available for transportation. The list of objects is based on information obtained from the embedded landscape API 370.

At 310, the embedded tenant 360 sends a request to the embedded landscape API 370 to get objects.

At 311, the embedded landscape API 370 returns the list of objects to the embedded tenant 360.

At 312, the embedded tenant 360 returns successfully and the list of objects is presented in the user interface (e.g., in the child window).

At 313, the user selects one or more objects from the list of objects to be replicated from the embedded tenant 360 to the enterprise tenant 340.

At 314, the user confirms the selection and the process returns the selection.

At 315, the user's selections of objects are returned to the enterprise tenant 340.

At 316, the enterprise application sends a request to the enterprise CMS 380 to create a replicate content job. The request may include the user's selection of objects to be transported.

At 317, the enterprise CMS 380 returns a success indication to the enterprise tenant 340.

At 318, the enterprise tenant 340 returns successfully.

At 319, the replicate content job is initiated. The replication is performed in the background from the perspective of the user of the enterprise tenant 340.

At 320, the enterprise CMS 380 sends an export package request to the embedded CMS 390. The export package request may include the user's selection of objects to be transported.

At 321, the embedded CMS 390 returns a success indication to the enterprise CMS 380.

At 322, the enterprise CMS 380 initiates import of the package. That is, import of the objects selected by the user.

At 323, the enterprise CMS 380 sends a pull objects request to the embedded CMS 390. The objects selected by the user are imported from the embedded tenant 360 to the enterprise tenant 340. That is, the content selected by the user is replicated from the embedded tenant 360 to the enterprise tenant 340.

At 324, the embedded CMS 390 returns an indication of success to the enterprise CMS 380.

At 325, the enterprise CMS 380 returns successfully.

At 326, the enterprise CMS 380 sends a request to the embedded CMS 390 to delete the package. The embedded CMS 390 may delete the package. That is, it may delete the package of objects selected by the user which was already imported by the enterprise tenant 340.

At 327, the embedded CMS 390 returns an indication of success to the enterprise CMS 380.

At 328, the enterprise CMS 380 returns successfully. Thus, the content selected by the user of the enterprise tenant 340 has been successfully replicated from the embedded tenant 360 to the enterprise tenant 340.

FIGS. 4-7 show examples user interfaces corresponding to the user interfaces used in the content replication techniques described herein.

Figure 4:
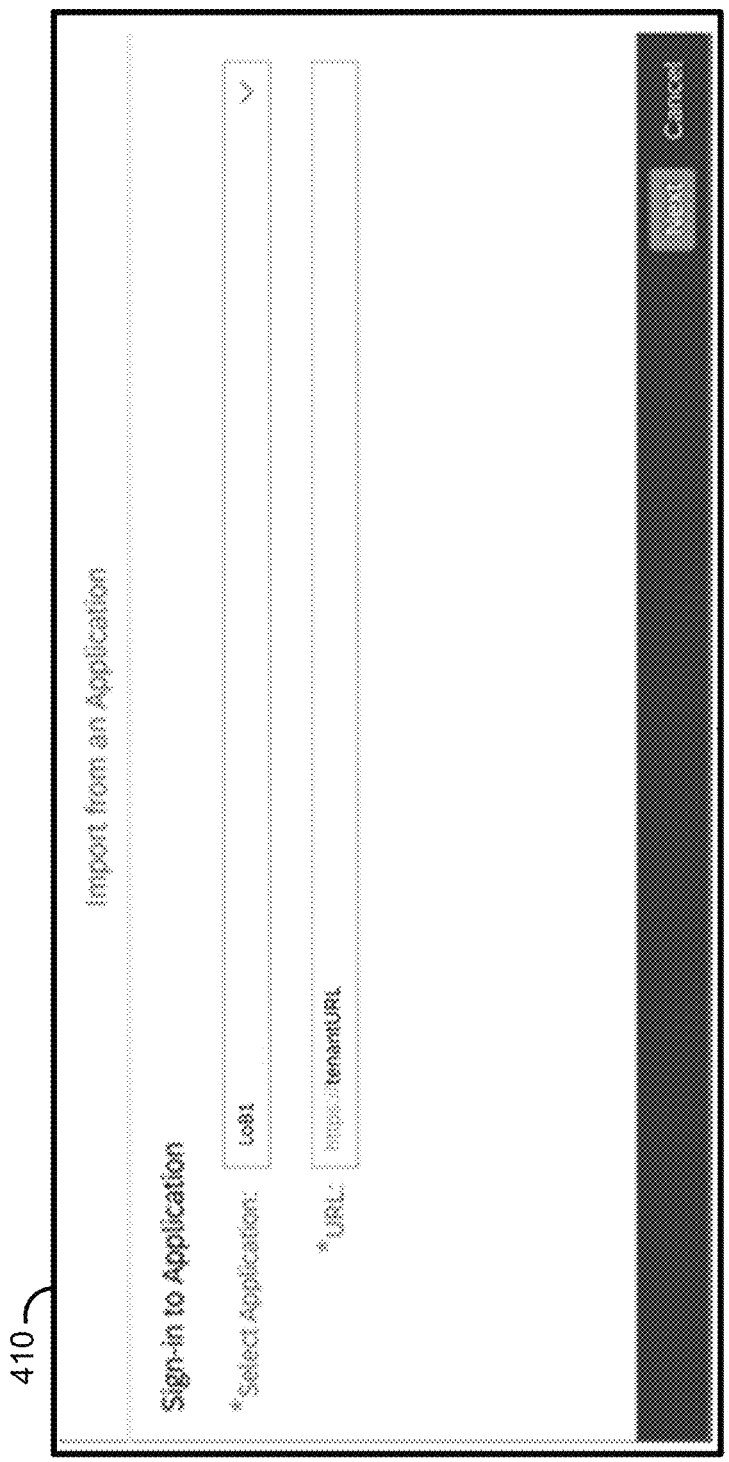
FIG. 4 shows a user interface for inputting a URL of a source tenant to initiate content replication between tenants, according to an embodiment.

FIG. 4 shows a user interface 410 for inputting a URL of a source tenant to initiate content replication between tenants, according to an embodiment. The user interface 410 is an example of a "parent window" as described herein. In the user interface 410 the user can select an application and input a tenant URL.

Figure 5:
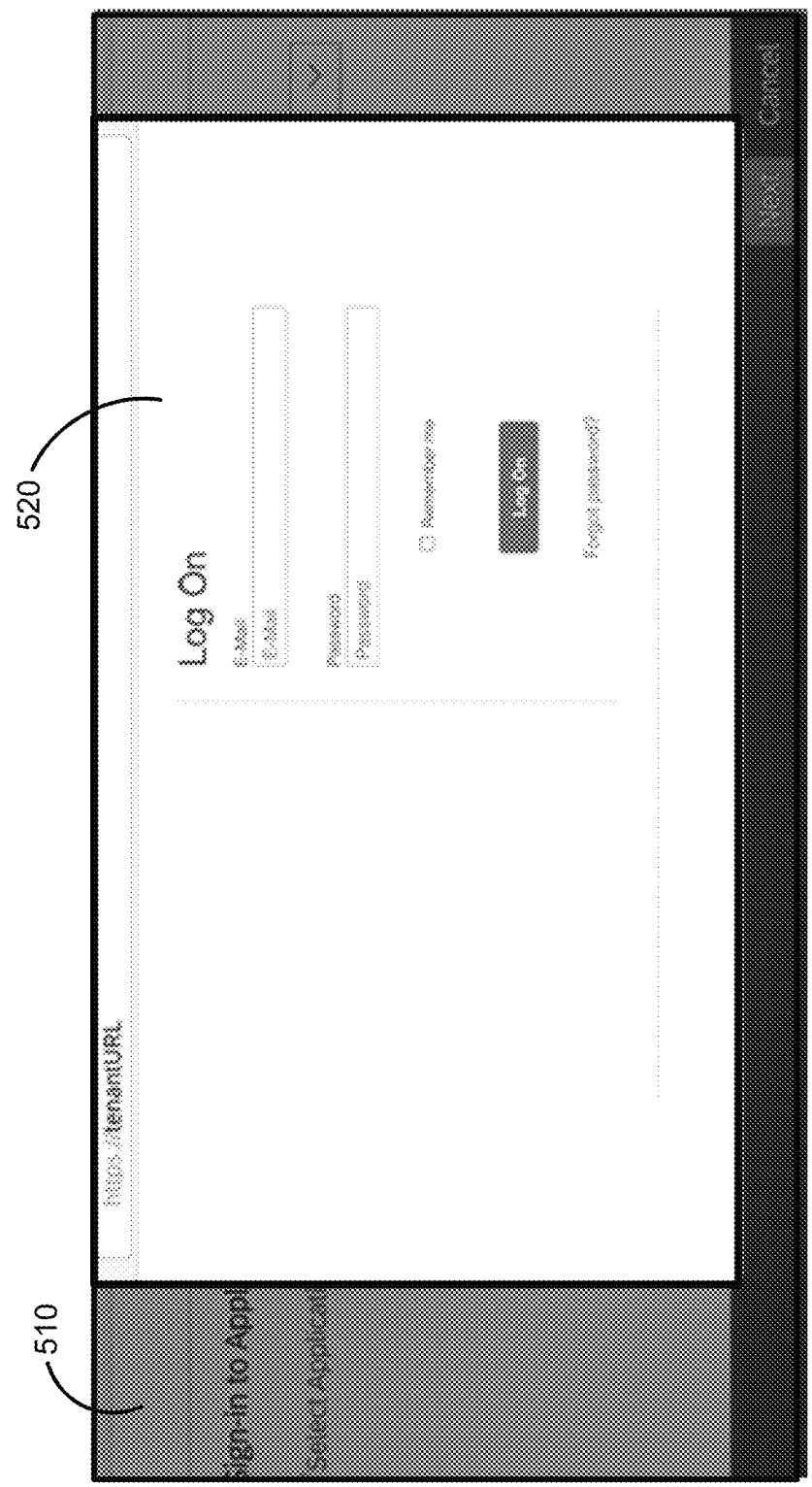
FIG. 5 shows a user interface for authenticating with a source tenant, according to an embodiment.

FIG. 5 shows a user interface 520 for authenticating with a source tenant, according to an embodiment. The user interface 520 enables the user to input their email address and a password. The user interface 520 is an example of a "child window" as described herein. The "parent window" 510 is shown in the background.

Figure 6:
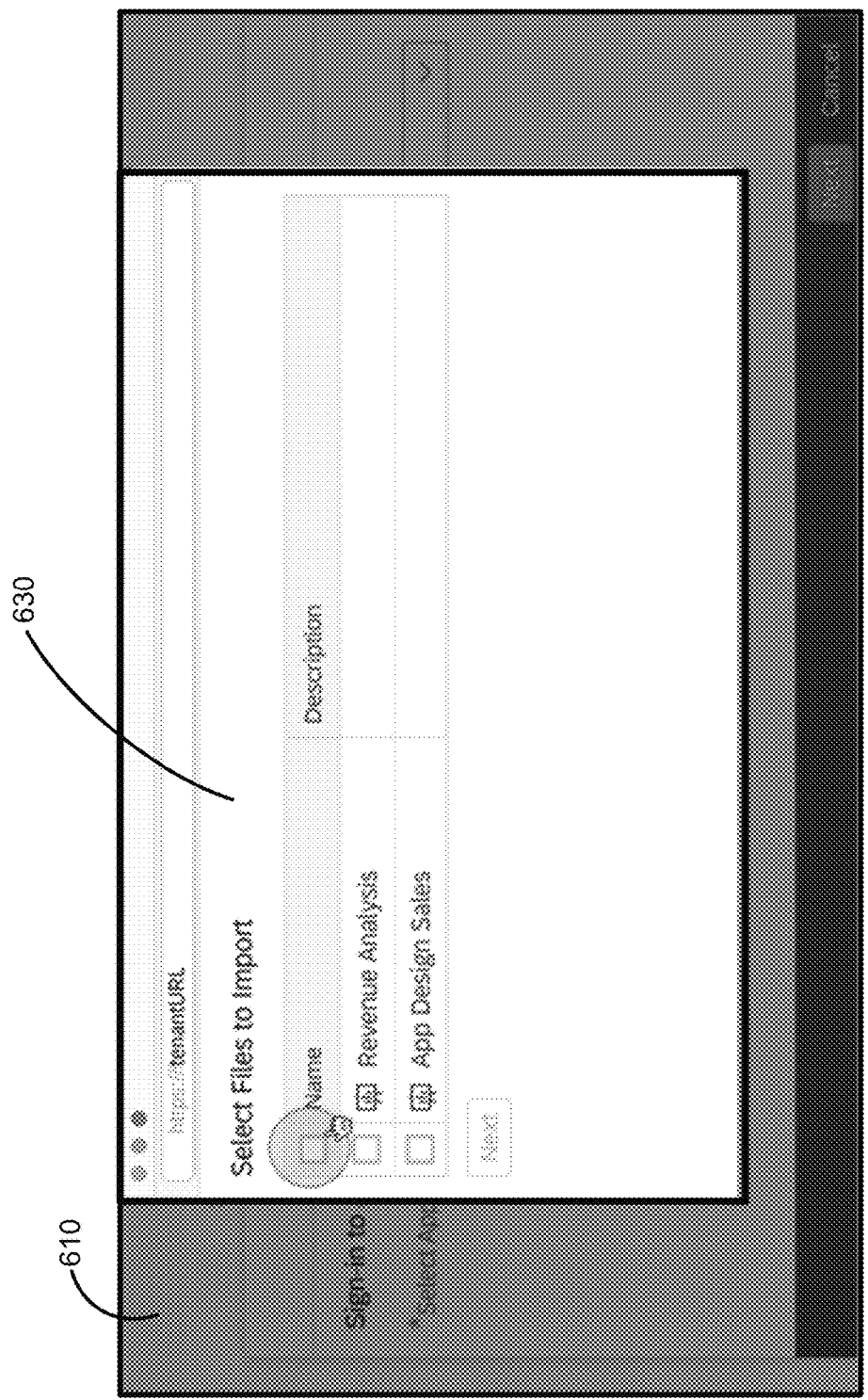
FIG. 6 shows a user interface for selecting files to import via content replication, according to an embodiment.

FIG. 6 shows a user interface 630 for selecting files to import via content replication, according to an embodiment. The user interface 630 shows two files available to be imported, a "Revenue Analysis" file and an "App Design Sales" file. The user may select these files using check boxes. This user interface 630 is also referred to as a "child window" herein. The "parent window" 610 is shown in the background.

Figure 7:
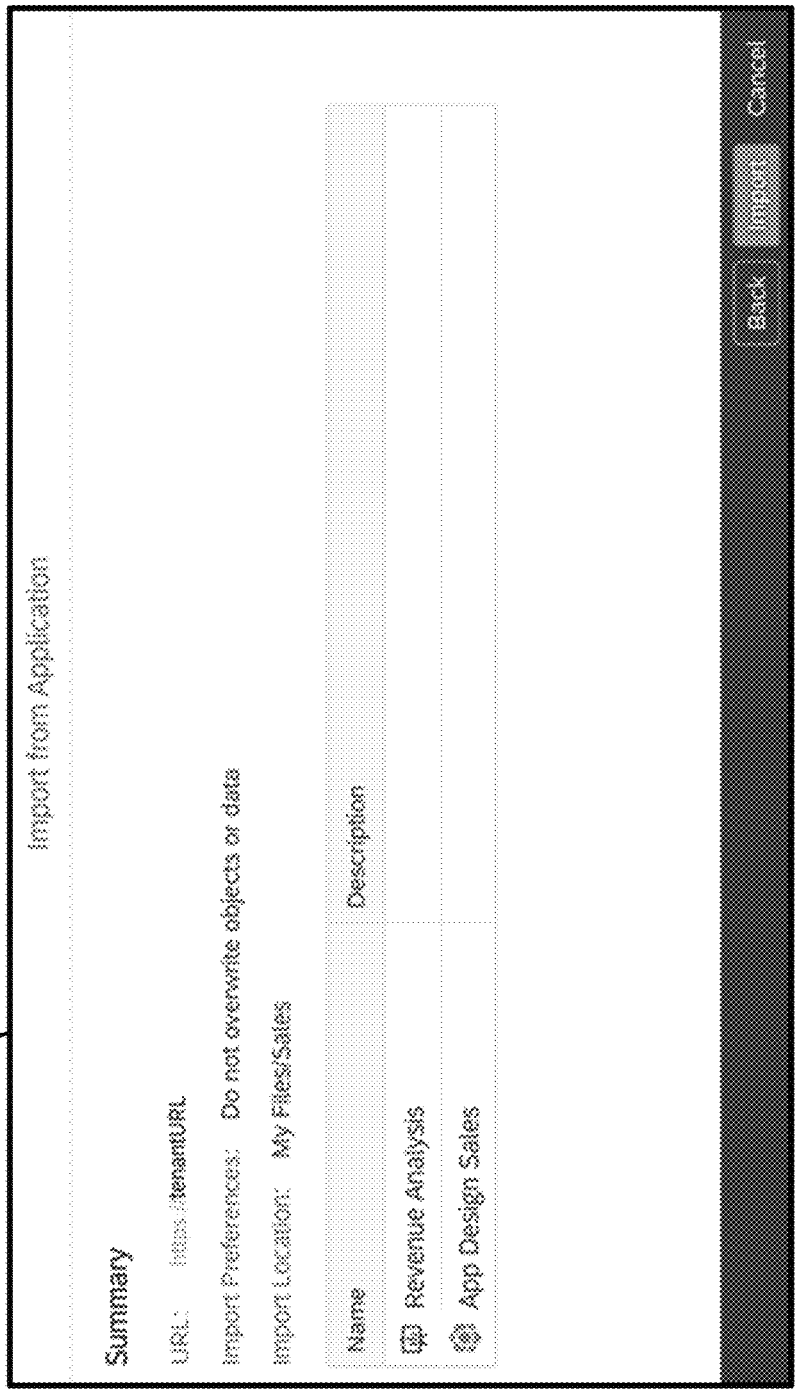
FIG. 7 shows a review and confirmation user interface for content replication, according to an embodiment.

FIG. 7 shows a review and confirmation user interface 740 for content replication, according to an embodiment. The user interface 740 lists the "Revenue Analysis" file and the "App Design Sales" file to be replicated.

FIG. 8 shows an example of a replicate content job request 800, according to an embodiment. The request may contain user selected objects and the enterprise tenant URL which is fired by enterprise CMS to embedded CMS in order to replicate content from embedded to enterprise tenant. In this example, the enterprise tenant URL (https://sap-analytics.cloud/tenant/URL/) and the user selected objects ("Revenue Analysis" and "App Design Sales") are highlighted in FIG. 8.

Example Hardware

Figure 9:
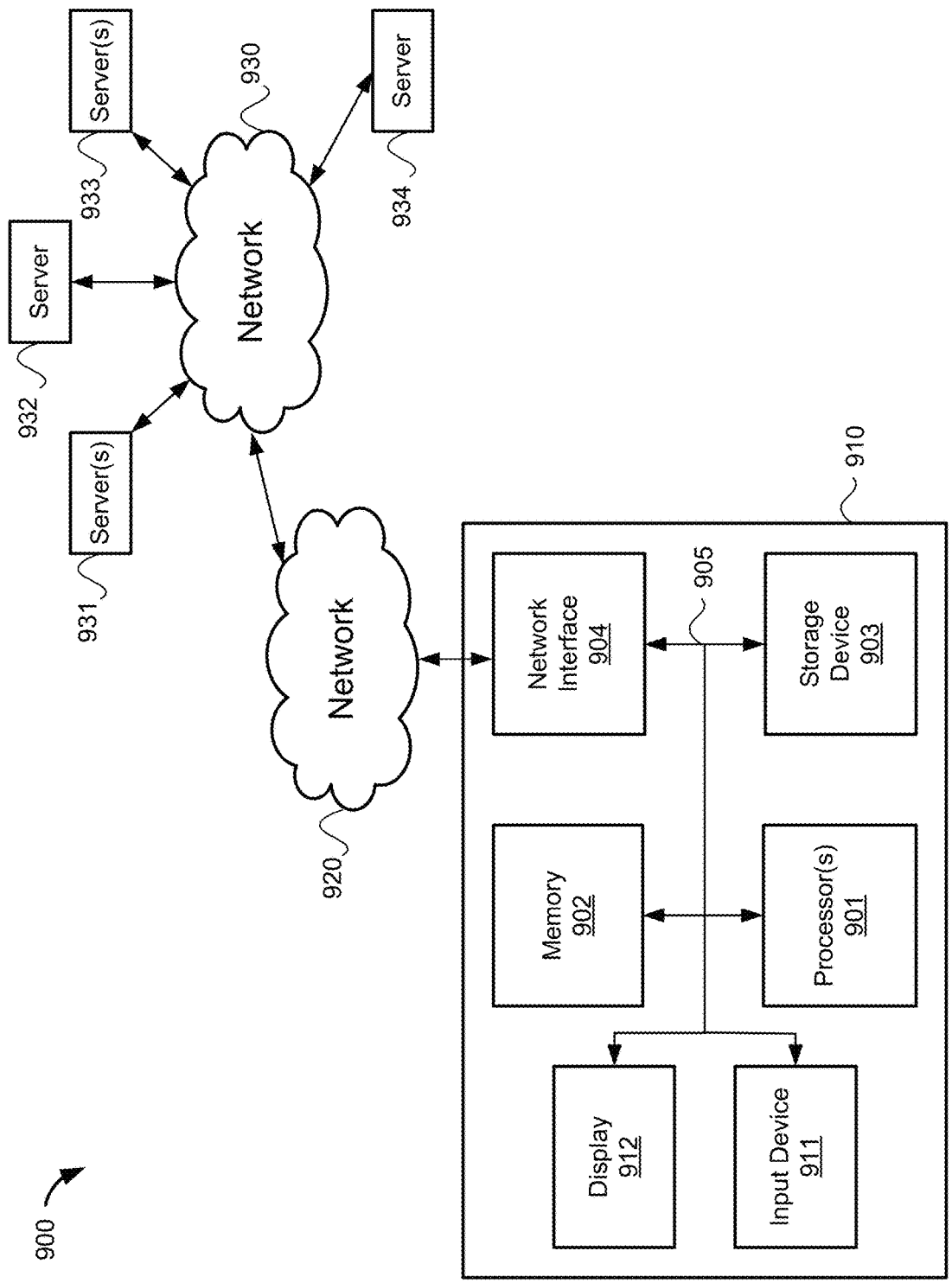
FIG. 9 shows a diagram of hardware of a special purpose computing machine for implementing systems and methods described herein.

FIG. 9 shows a diagram 900 of hardware of a special purpose computing machine for implementing systems and methods described herein. The following hardware description is merely one example. It is to be understood that a variety of computers topologies may be used to implement the above described techniques. The hardware shown in FIG. 9 may be used to implement the computer systems and computer software (computer reprogram code) described herein.

The computer system 910 includes a bus 905 or other communication mechanism for communicating information, and one or more processor(s) 901 coupled with bus 905 for processing information. The computer system 910 also includes a memory 902 coupled to bus 905 for storing information and instructions to be executed by processor 901, including information and instructions for performing some of the techniques described above, for example. This memory may also be used for storing programs executed by processor(s) 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 903 may include source code, binary code, or software files for performing the techniques above, for example. Storage device and memory are both examples of non-transitory computer readable storage mediums.

The computer system 910 may be coupled via bus 905 to a display 912 for displaying information to a computer user. An input device 911 such as a keyboard, touchscreen, and/or mouse is coupled to bus 905 for communicating information and command selections from the user to processor 901. The combination of these components allows the user to communicate with the system. In some systems, bus 905 represents multiple specialized buses, for example.

The computer system also includes a network interface 904 coupled with bus 905. The network interface 904 may provide two-way data communication between computer system 910 and a network 920. The network interface 904 may be a wireless or wired connection, for example. The network 920 may be a local area network or an intranet, for example. The computer system 910 can send and receive information through the network interface 904, across the network 920, to computer systems connected to the Internet 930. Using the Internet 930 the computer system 910 may access data and features that reside on multiple different hardware servers 931-934. The servers 931-934 may be part of a cloud computing environment in some embodiments.

EXAMPLE EMBODIMENTS

The following are example embodiments of the present disclosure.

Some embodiments provide a computer system, comprising one or more processors and one or more machine-readable medium coupled to the one or more processors and storing computer program code comprising sets instructions executable by the one or more processors. The instructions being executable to provide a user interface to an application of an enterprise tenant, the user interface including a list of files shared by an embedded tenant. The instructions being further executable to obtain a selection from a user of one or more selected files from the list of files. The instructions being further executable to initiate a replicate content job based on the one or more selected files, the replicate content job including pulling each of the one or more selected files from the embedded tenant to the enterprise. The instructions being further executable to store the file in the enterprise tenant database.

In some embodiments of the computer system instructions are further executable to obtain a uniform resource locator input via a second user interface, the uniform resource locator used to obtain the list of files.

In some embodiments of the computer system instructions are further executable to obtain a selection via the user interface of an application to use for content replication.

In some embodiments of the computer system the embedded tenant is embedded within a cloud application.

In some embodiments of the computer system the embedded tenant is an embedded analytics application and the enterprise tenant provided an enterprise analytics application.

In some embodiments of the computer system instructions are further executable to obtain authentication information via the user interface, the list of files being presented in response to authentication of the authentication information.

In some embodiments of the computer system instructions are further executable to clean up temporary folders and delete a package used for content replication.

Some embodiments provide one or more non-transitory computer-readable medium storing computer program code comprising sets of instructions. The computer program code comprises sets of instructions to provide a user interface to an application of an enterprise tenant, the user interface including a list of files shared by an embedded tenant. The computer program code further comprises sets of instructions to obtain a selection from a user of one or more selected files from the list of files. The computer program code further comprises sets of instructions to initiate a replicate content job based on the one or more selected files, the replicate content job including pulling each of the one or more selected files from the embedded tenant to the enterprise. The computer program code further comprises sets of instructions to store the file in the enterprise tenant database.

In some embodiments of the one or more non-transitory computer-readable medium, the computer program code further comprises sets of instructions to obtain a uniform resource locator input via a second user interface, the uniform resource locator used to obtain the list of files.

In some embodiments of the one or more non-transitory computer-readable medium, the computer program code further comprises sets of instructions to obtain a selection via the user interface of an application to use for content replication.

In some embodiments of the one or more non-transitory computer-readable medium, the embedded tenant is embedded within a cloud application.

In some embodiments of the one or more non-transitory computer-readable medium, the embedded tenant is an embedded analytics application and the enterprise tenant provided an enterprise analytics application.

In some embodiments of the one or more non-transitory computer-readable medium, the computer program code further comprises sets of instructions to obtain authentication information via the user interface, the list of files being presented in response to authentication of the authentication information.

In some embodiments of the one or more non-transitory computer-readable medium, the computer program code further comprises sets of instructions to clean up temporary folders and delete a package used for content replication.

Some embodiments provide a computer-implemented method. The computer-implemented method includes providing a user interface to an application of an enterprise tenant, the user interface including a list of files shared by an embedded tenant. The computer-implemented method further includes obtaining a selection from a user of one or more selected files from the list of files. The computer-implemented method further includes initiating a replicate content job based on the one or more selected files, the replicate content job including pulling each of the one or more selected files from the embedded tenant to the enterprise. The computer-implemented method further includes storing the file in the enterprise tenant database.

In some embodiments the computer-implemented method further includes obtaining a uniform resource locator input via a second user interface, the uniform resource locator used to obtain the list of files.

In some embodiments the computer-implemented method further includes obtaining a selection via the user interface of an application to use for content replication.

In some embodiments the computer-implemented method the embedded tenant is embedded within a cloud application.

In some embodiments the computer-implemented method further includes obtaining authentication information via the user interface, the list of files being presented in response to authentication of the authentication information.

In some embodiments the computer-implemented method further includes obtaining authentication information via the user interface, the list of files being presented in response to authentication of the authentication information.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
provide a user interface to an application of an enterprise tenant, the user interface including a list of files shared by an embedded tenant with the enterprise tenant, wherein the embedded tenant is embedded within a second enterprise tenant, and wherein the enterprise tenant is coupled to an enterprise content management service and the embedded tenant is coupled to an embedded content management service;
obtain a selection from a user of one or more selected files from the list of files;
send the selection of the one or more selected files from the embedded tenant to the enterprise tenant;
send a request to initiate a replicate content job from the enterprise tenant to the enterprise content management service, the request including the selection of the one or more selected files;
initiate, by the enterprise content management service, the replicate content job based on the one or more selected files, the replicate content job including pulling each of the one or more selected files from the embedded tenant content management service to the enterprise tenant content management service; and
store the selected files in an enterprise tenant content management service.

2. The computer system of claim 1, wherein the computer program code further comprises sets of instructions executable by the one or more processors to:
obtain, by the enterprise tenant from the second enterprise tenant, an embedded tenant uniform resource locator, the embedded tenant uniform resource locator used to obtain the list of files from the embedded tenant.

3. The computer system of claim 1, wherein the computer program code further comprises sets of instructions executable by the one or more processors to:
obtain a selection via the user interface of an application to use for content replication.

4. The computer system of claim 1, wherein the embedded tenant is embedded within a cloud application.

5. The computer system of claim 1, wherein the embedded tenant is an embedded analytics application and the enterprise tenant is an enterprise analytics application.

6. The computer system of claim 1, wherein the computer program code further comprises sets of instructions executable by the one or more processors to:
obtain authentication information via the user interface, the list of files being presented in response to authentication of the authentication information.

7. The computer system of claim 1, wherein the computer program code further comprises sets of instructions executable by the one or more processors to:
clean up temporary folders and delete a package used for content replication.

8. One or more non-transitory computer-readable medium storing computer program code comprising sets of instructions to:

provide a user interface to an application of an enterprise tenant, the user interface including a list of files shared by an embedded tenant with the enterprise tenant, wherein the embedded tenant is embedded within a second enterprise tenant, and wherein the enterprise tenant is coupled to an enterprise content management service and the embedded tenant is coupled to an embedded content management service;

obtain a selection from a user of one or more selected files from the list of files;

send the selection of the one or more selected files from the embedded tenant to the enterprise tenant;

send a request to initiate a replicate content job from the enterprise tenant to the enterprise content management service, the request including the selection of one or more selected files;

initiate, by the enterprise content management service, the replicate content job based on the one or more selected files, the replicate content job including pulling each of the one or more selected files from the embedded tenant content management service to the enterprise tenant content management service; and store the selected files in an enterprise tenant content management service.

9. The non-transitory computer-readable medium of claim 8, wherein the computer program code further comprises sets of instructions to:

obtain a uniform resource locator input via a second user interface, the uniform resource locator used to obtain the list of files.

10. The non-transitory computer-readable medium of claim 8, wherein the computer program code further comprises sets of instructions to:

obtain a selection via the user interface of an application to use for content replication.

11. The non-transitory computer-readable medium of claim 8, wherein the embedded tenant is embedded within a cloud application.

12. The non-transitory computer-readable medium of claim 8, wherein the embedded tenant is an embedded analytics application and the enterprise tenant is an enterprise analytics application.

13. The non-transitory computer-readable medium of claim 8, wherein the computer program code further comprises sets of instructions to:

obtain authentication information via the user interface, the list of files being presented in response to authentication of the authentication information.

14. The non-transitory computer-readable medium of claim 8, wherein the computer program code further comprises sets of instructions to:

clean up temporary folders and delete a package used for content replication.

15. A computer-implemented method, comprising:

providing a user interface to an application of an enterprise tenant, the user interface including a list of files shared by an embedded tenant with the enterprise tenant, wherein the embedded tenant is embedded within a second enterprise tenant, and wherein the enterprise tenant is coupled to an enterprise content management service and the embedded tenant is coupled to an embedded content management service;

obtaining a selection from a user of one or more selected files from the list of files;

sending the selection of the one or more selected files from the embedded tenant to the enterprise tenant;

sending a request to initiate a replicate content job from the enterprise tenant to the enterprise content management service, the request including the selection of the one or more selected files;

initiating, by the enterprise content management service, the replicate content job based on the one or more selected files, the replicate content job including pulling each of the one or more selected files from the embedded tenant content management service to the enterprise tenant content management service; and storing the file in an enterprise tenant content management service database.

16. The computer-implemented method of claim 15, further comprising:

obtaining a uniform resource locator input via a second user interface, the uniform resource locator used to obtain the list of files.

17. The computer-implemented method of claim 15, further comprising:

obtaining a selection via the user interface of an application to use for content replication.

18. The computer-implemented method of claim 15, wherein the embedded tenant is embedded within a cloud application.

19. The computer-implemented method of claim 15, further comprising:

obtaining authentication information via the user interface, the list of files being presented in response to authentication of the authentication information.

20. The computer-implemented method of claim 15, wherein the second enterprise tenant is a line-of-business application.

* * * * *